United States Patent [19]
Zuffada et al.

[11] Patent Number: 6,067,198
[45] Date of Patent: *May 23, 2000

[54] APPARATUS AND METHOD FOR PROCESSING A DATA SIGNAL FROM A MAGNETIC-MEDIA READING HEAD

[75] Inventors: Maurizio Zuffada, Milan; Paolo Gadducci, Pisa; David Moloney, Cornaredo; Roberto Alini, Stradella, all of Italy

[73] Assignee: STMicroelectronics S.r.l., Milan, Italy

[*] Notice: This patent issued on a continued prosecution application filed under 37 CFR 1.53(d), and is subject to the twenty year patent term provisions of 35 U.S.C. 154(a)(2).

[21] Appl. No.: 08/448,047

[22] Filed: May 23, 1995

[30] Foreign Application Priority Data

May 23, 1994 [EP] European Pat. Off. ............. 94830236

[51] Int. Cl.⁷ .............................. G11B 5/09; G11B 5/035; H03H 7/30
[52] U.S. Cl. ................................. 360/46; 360/40; 360/51; 360/65; 375/232
[58] Field of Search ................. 360/40, 46, 51, 360/32, 77.08, 65; 375/230, 262, 263, 341, 232

[56] References Cited

U.S. PATENT DOCUMENTS

| | | | |
|---|---|---|---|
| 4,481,643 | 11/1984 | Kitazawa | 375/230 |
| 4,570,193 | 2/1986 | Yamashita | 386/93 |
| 5,021,894 | 6/1991 | Naito et al. | 360/46 |
| 5,089,757 | 2/1992 | Wilson | 318/560 |
| 5,255,128 | 10/1993 | Inoue et al. | 360/40 |
| 5,255,131 | 10/1993 | Coker et al. | 360/48 |
| 5,325,322 | 6/1994 | Bailey et al. | 364/825 |
| 5,420,893 | 5/1995 | Ward | 360/51 |
| 5,424,881 | 6/1995 | Behrens et al. | 360/40 |
| 5,592,340 | 1/1997 | Minuhin et al. | 360/65 |
| 5,668,678 | 9/1997 | Reed et al. | 360/51 |
| 5,774,298 | 6/1998 | Cheung et al. | 360/77.08 |
| 5,796,535 | 8/1998 | Tuttle et al. | 360/51 |

FOREIGN PATENT DOCUMENTS

| | | | |
|---|---|---|---|
| 0 385 867 | 9/1990 | European Pat. Off. | H04N 5/92 |
| 0 514 991 | 11/1992 | European Pat. Off. | G11B 20/10 |
| 0 595 454 | 5/1994 | European Pat. Off. | G11B 20/10 |
| 61-71470 | 4/1986 | Japan . | |
| 63-18821 | 1/1988 | Japan . | |
| 6-176499 | 6/1994 | Japan . | |

OTHER PUBLICATIONS

Forney, Jr., "The Viterbi Algorithm," *Proceedings of the IEEE* 61(3):268–278, Mar. 1973.

Spencer et al., "Analog Implementations of Sampling Detectors," *IEEE Transactions on Magnetics* 27(6):4516–4521, Nov. 1991.

Siegel et al., "Modulation and Coding for Information Storage," *IEEE Communications Magazine*, pp. 69–86, Dec. 1991.

Goodenough, "DSP Technique Nearly Doubles Disk Capacity," *Electronic Design*, pp. 53–56, Feb. 1993.

*Primary Examiner*—Nabil Hindi
*Assistant Examiner*—Regina Y. Neal
*Attorney, Agent, or Firm*—Theodore E. Galanthay; Robert Iannucci; Seed IP Law Group, PLLC

[57] ABSTRACT

A device comprises a variable-gain input amplifier, a low-pass analog filter, a transversal continuous-time analog filter, and two distinct and parallel sampling channels interposed between the transversal analog filter and an RLL-NRZ decoder. The two sampling channels each comprise an analog-to-digital converter and a Viterbi detector arranged in series and operating according to sampling sequences that alternate with one another.

12 Claims, 1 Drawing Sheet

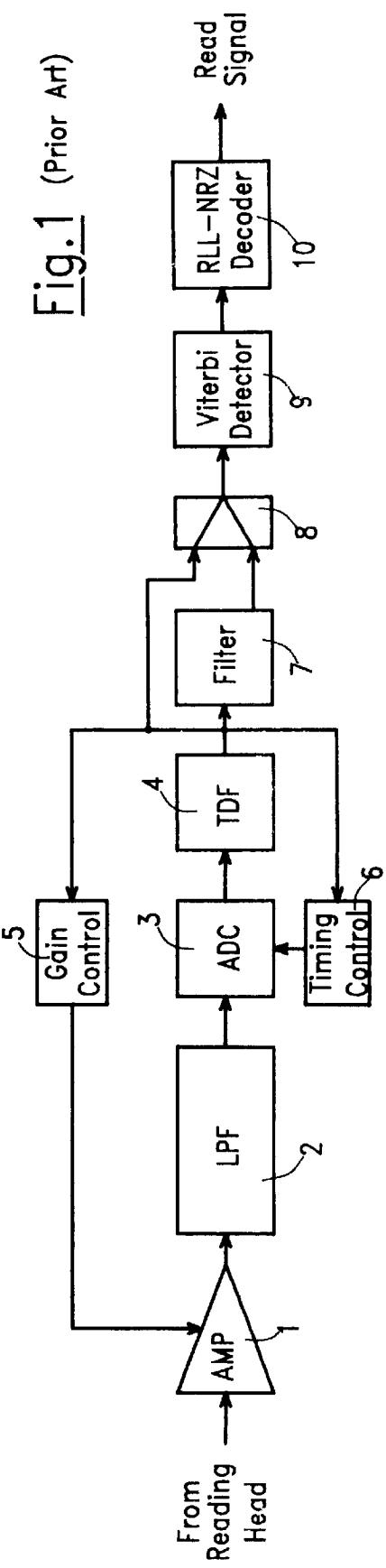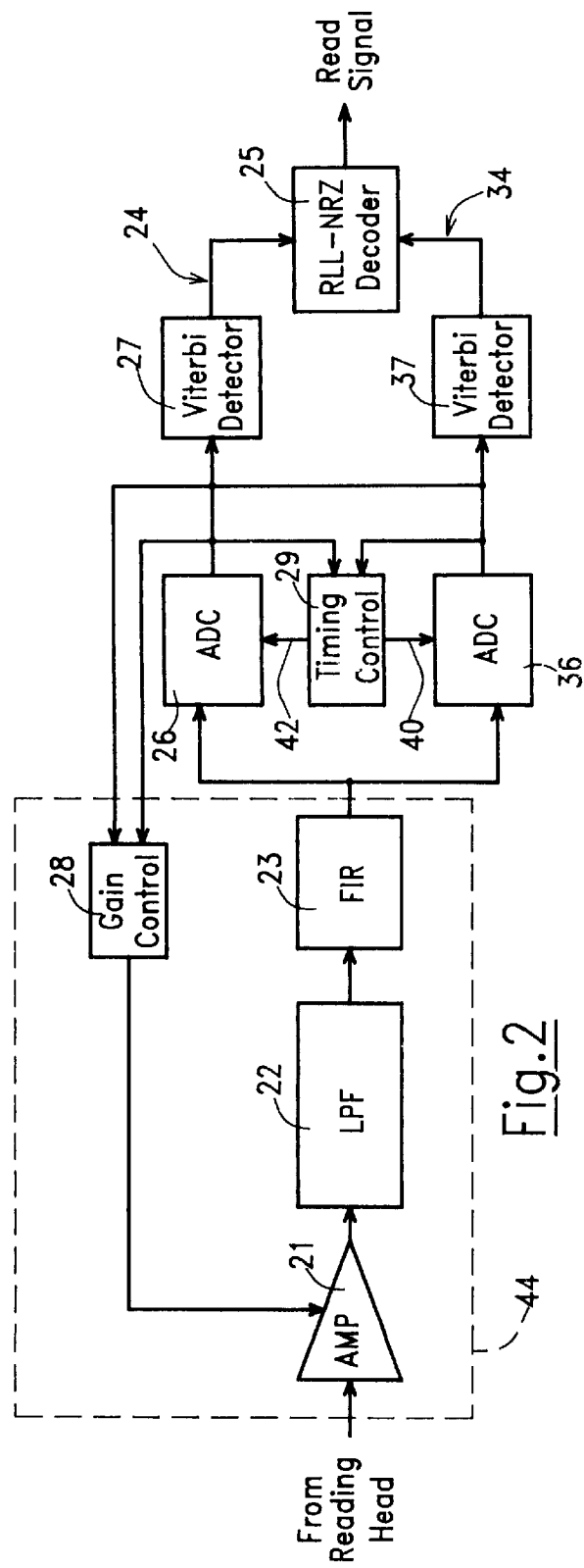

APPARATUS AND METHOD FOR PROCESSING A DATA SIGNAL FROM A MAGNETIC-MEDIA READING HEAD

CROSS-REFERENCE TO RELATED APPLICATIONS

The present invention claims priority from European Patent Application No. 94830236.9, filed May 23, 1994, and incorporated herein by reference. The present application is related to pending U.S. Patent Application entitled "APPARATUS AND METHOD FOR GENERATING A CONTROL SIGNAL FOR A MAGNETIC-MEDIA READING HEAD", by Maurizio Zuffada, Paolo Gadducci, David Moloney and Valerio Pisati and filed concurrently herewith (Seed and Berry Docket No. 853063.416), which claims priority from European Patent Application No. 94830235.1, filed May 23, 1994, all of which are incorporated herein by reference.

TECHNICAL FIELD

The present invention relates to a parallel architecture PRML device for processing signals from a magnetic head during a reading step of data stored on a magnetic support.

BACKGROUND OF THE INVENTION

The PRML initials (Partial-Response signaling with Maximum-Likelihood sequence detection) are used to identify a technique for processing data read on a magnetic support (such as a hard disk or a magnetic tape), that provides for the use and sampling of only a part of the input signal's frequency band and the search for the maximum likelihood of correspondence of the levels of the output signal with the samples obtained from the input signal.

In a known PRML reading/writing channel the analog signal from the magnetic head is processed and reconstructed digitally through an apparatus that carries out a first analog equalization by means of a variable-gain input amplifier and a continuous low-pass filter, at whose output, with a suitable selection of the cut-off frequency, of the high-frequency accentuation (boost) and of other parameters such as group delay, it is possible to obtain a signal with a minimum InterSymbol Interference, ISI. The output of the analog filter is then sampled through an analog-digital converter and subsequently processed through a transversal digital filter (called FIR, Finite Impulse Response), that further reduces the ISI, possibly another filter (Pole Tip Filter) that eliminates the small undesired peaks produced when the magnetic support enters or leaves the influence area of a thin-film reading head, a Viterbi detector (that is, a maximum likelihood sequence detector operating with the so-called Viterbi algorithm, for example described in G. D. Forney, Jr., "The Viterbi Algorithm", *Proc. IEEE* 61(3) :268–278, March 1973), that converts a sequence with many bits into a sequence with just one bit on the basis of a maximum likelihood concept) and a decoder capable of converting the RLL (Run Length Limited) code commonly utilized for writing data on a magnetic support in the NRZ (Non-Return to Zero) code commonly utilized for using the read signal on the part of the user.

There are also two feed-back loops, of which one containing a unit for controlling the gain of the input amplifier, that allows the stabilization of the input signal's amplitude, and the other containing a unit for controlling the timing, that allows the timing signal of the analog-digital converter to be reconstructed from the data read on the magnetic support.

There are at least two problems with these known devices. A first problem is the delay (also called "latency") inherent in the timing loop and a second problem is performance of the analog-digital converter.

The timing loop contains the analog-digital converter, the digital filter and the timing control unit. If operations are carried out with samples and medium-to-high resolution filtering coefficients, the digital filter and the timing control unit, which include adders and multipliers, are necessarily pipelined (that is, operated in succession). Such pipelining often introduces delays into the timing loop.

The analog-to-digital converter often must operate at a sampling rate equal to the RLL code's bit rate of the reading channel (typically 100 MHz). This sampling rate is difficult to obtain with a low power dissipation and a high degree of accuracy.

Another problem with these known devices is that the Viterbi detector, which is a fairly complex functional unit operating at a fairly high frequency substantially equal to the RLL code's bit rate serially processes the signal samples.

SUMMARY OF THE INVENTION

An object of the present invention is to provide a PRML device that does not exhibit the drawbacks associated with known devices.

According to one aspect of the invention, a device includes a variable-gain input amplifier, a low-pass analog filter, a transversal filter, analog-to-digital conversion means, means for controlling the gain of the input amplifier, means for reconstructing the timing signal for the analog-to-digital conversion means, Viterbi detector means, and an RLL-NRZ decoder. The transversal filter composes an analog filter arranged at the output of the low-pass filter. The analog-to-digital conversion means and the Viterbi detector means together compose two analog-to-digital converters and two Viterbi detectors serially arranged in two parallel processing channels that are interposed between the transversal filter and the RLL-NRZ decoder and that operate according to sampling sequences that alternate with one another.

Thus in this aspect of the invention, two analog-to-digital converters are used instead of one, and each individual converter operates at a frequency equal to half the RLL code bit rate. Advantages of such a system include improved jitter tolerance and thus conversion accuracy. Furthermore, since the criticality of an analog-to-digital converter is proportional to the clock rate, the 50% reduction in the sampling frequency translates into a better feasibility of the entire system.

The sole Viterbi detector of the known art is now replaced with two detectors (one for even bit sequences, the other for odd bit sequences) that operate at a frequency equal to half the RLL code bit rate. This allows high sampling rates (greater than 140 Mbs) to be processed with well-tested and reliable technologies (for example, BiCMOS 0.7 micron, npn, 12 GHz).

Lastly, the shift of the transversal filter upstream of the analog-to-digital converters (to accommodate the use of two distinct digital processing channels) provides the filter's analog continuous-time realization with the advantages of higher speed, higher coefficient resolution, and less silicon area with respect to a corresponding digital filter. Moreover such a different arrangement of the transversal filter reduces the latency of the timing control loop and enhances the capacity to reconstruct the intrinsic timing of the RLL signal.

In order to carry out the alternation of the two operating sequences, the features of any suitable code for writing data on the magnetic support may be exploited to derive a corresponding RLL reading code with the alternate use of even and odd index samples. A suitable code, for example, is that known with the initials RLL (0, 4/4), that can be used with PRML channels with a PR4-type response (class-4 partial response channel), as described in Paul H. Siegel and Jack K. Wolf, "Modulation and Coding for Information Storage", IEEE Communications Magazine, December 1991, pages 68–86.

BRIEF DESCRIPTION OF THE DRAWINGS

The features of the present invention will be better understood by making reference, as an example, to the enclosed drawings, wherein:

FIG. 1 is a block diagram of an existing device; and

FIG. 2 is a block diagram of a device according to the present invention.

DETAILED DESCRIPTION OF THE INVENTION

There is represented in FIG. 1 a known device of the type mentioned above.

This device includes a variable-gain input amplifier 1, a low-pass analog filter 2, an analog-to-digital converter 3, a transversal digital filter 4, a gain control unit 5 inserted in a gain control loop for the input amplifier 1, a timing control unit 6 inserted in a timing control loop for the converter 3, a further filter 7 for eliminating the undesired peaks produced by thin-film heads (if present), an on/off switch 8 for the filter 7, a Viterbi detector 9, and an RLL-NRZ decoder 10.

There is on the other hand represented in FIG. 2 a device according to the present invention, that includes a variable-gain input amplifier 21, a low-pass analog filter 22, and a transversal continuous-time analog filter (FIR) 23. These components compose a front end circuit 44 that provides an analog signal containing read data (from the magnetic media, not shown) at the output of filter 23.

Two parallel sampling channels 24 and 34 branch out from the output of filter 23 and converge in an RLL-NRZ decoder 25. Each branch 24 and 34 respectively includes an analog-to-digital converter 26 and 36 and a Viterbi detector 27 and 37.

A gain control loop of the input amplifier 21 comprises a gain control unit 28 that receives the outputs of the two analog-to-digital converters 26 and 36 and controls on the basis thereof the gain of the input amplifier 21.

A timing control loop, that substantially includes two half-loops, one for each analog-to-digital converter 26 and 36, includes a timing control unit 29, which generates the clock signals 40 and 42 for the two converters 26 and 36. Unit 29 derives clock signals 40 and 42 from the data read from the magnetic support and provided via the outputs of converters 26 and 36.

The writing code used, such as for example the RLL code (0, 4/4), is such as to provide alternated sequences of samplings on the two channels 24 and 34, which thus respectively and independently process the even index samples and those with an odd index at a frequency equal to half the RLL frequency.

From the foregoing, it will be evident that although specific embodiments have been described herein for the purpose of illustrating the invention, various modifications may be made without deviating from the spirit and scope of the invention.

We claim:

1. A device to process read signals from a magnetic-media read head during reading of data stored on a magnetic support, said device comprising:

a variable-gain input amplifier;

a low-pass analog filter coupled to said amplifier to equalize the read signals;

a transversal continuous-time analog filter coupled to said low-pass analog filters, the transversal continuous-time analog filter structured to receive an output from the low-pass analog filter and structured to directly output a continuous analog signal;

an analog-to-digital converter circuit coupled to an output of the transversal continuous-time analog filter;

a gain control unit to control the gain of the input amplifier;

a reconstructing circuit including a timing control loop to reconstruct a timing signal for said analog-to-digital converter circuit from said read signals;

a Viterbi detector circuit coupled to said analog-to-digital converter circuit; and a decoder coupled to said Viterbi detector circuit, wherein said transversal continuous-time analog filter comprises an analog filter arranged at the output of said low-pass analog filter, and said analog-to-digital converter circuit and said Viterbi detector circuit respectively comprise two analog-to-digital converters and two Viterbi detectors arranged in succession one after the other in two parallel processing channels that are interposed between said transversal continuous-time analog filter and said decoder, wherein the timing control loop is coupled to the analog-to-digital converters, said converters and detectors operating according to sampling sequences that alternate with one another.

2. Device according to claim 1, characterized in that the device processes said read signals using a run-length-limited code (0, 4/4).

3. An apparatus to process an analog data signal generated by a read head while reading a magnetic medium, comprising:

a transversal continuous-time analog filter coupled to receive said analog data signal from said read head and to directly output a continuous time signal representative of said analog data signal;

at least two parallel channels coupled to said continuous-time analog filter to directly receive the continuous-time signal, each channel including, a converter coupled to an output of said continuous time analog filter and structured to convert a portion of the continuous-time signal from said continuous time analog filter into a digital data signal, wherein the converter has an output coupled to a timing control loop and a Viterbi detector structured to process said digital data signal; and a decoder coupled to said Viterbi detectors and structured to generate a read signal from said processed digital signals.

4. The apparatus of claim 3, further comprising a front-end circuit interposed between said head and said transversal continuous-time analog filter and structured to low-pass filter said analog data signal.

5. The apparatus of claim 4, further comprising a gain-control unit operable to control the gain of said front-end circuit in response to said digital signals from said converters.

6. The apparatus of claim 3, further comprising a timing-control unit operable to generate respective clock signals for said converters in response to said digital signals from said converters.

7. An apparatus to generate a read signal from data stored on a magnetic medium and read by a reading head, the apparatus comprising:

an amplifier structured to amplify an analog signal generated by said reading head;

a low-pass filter having an input terminal coupled to an output terminal of said amplifier to equalize the analog signal;

a transversal continuous-time analog filter having an input terminal coupled to an output terminal of said low-pass filter and structured to directly output a continuous-time filtered analog signal;

a run-length-limited-non-return-to-zero decoder structured to generate said read signal;

multiple parallel processing channels each including,
a converter having an input terminal coupled to an output terminal of said transversal continuous-time analog filter and structured to convert a portion of said filtered analog signal into a digital signal, and
a Viterbi filter interposed between an output terminal of said converter and an input terminal of said decoder;

a gain-control unit interposed between a gain terminal of said amplifier and said output terminals of said converters; and a timing-control unit interposed between clock inputs and said outputs of said converters, wherein the timing-control unit forms part of a timing control loop.

8. The apparatus of claim 7 wherein said analog signal is coded according to a run-length limited code (0, 4/4).

9. The apparatus of claim 7, further comprising two of said channels and wherein said portions are alternating sampling sequences of said filtered analog signal.

10. The apparatus of claim 8 wherein the inputs of said timing-control unit are directly connected to said outputs of said converters.

11. A method for processing an analog data signal generated by a reading head while reading a magnetic medium, the method comprising:

filtering said analog data signal with a transversal continuous-time analog filter structured to directly output continuous-time outputs;

directing a continuous-time filtered analog data signal from an output of the transversal continuous-time analog filter to converters;

concurrently converting first and second portions of said filtered analog data signal into first and second digital signals;

concurrently processing said first and second digital signals with respective first and second Viterbi detectors; and generating with a decoder a read signal from said processed digital signals.

12. The method of claim 11, further comprising low-pass filtering said analog data signal before said converting.

* * * * *